United States Patent [19]

Koleske et al.

[11] Patent Number: 4,555,449
[45] Date of Patent: Nov. 26, 1985

[54] MAGNETIC RECORDING MEDIUM

[75] Inventors: Joseph V. Koleske, Charleston, W. Va.; Glenn S. Peacock, Belle Mead; George T. Kwiatkowski, Green Brook, both of N.J.

[73] Assignee: Union Carbide Corporation, Danbury, Conn.

[21] Appl. No.: 578,422

[22] Filed: Feb. 9, 1984

[51] Int. Cl.$^4$ ................................................. G11B 5/70
[52] U.S. Cl. ............................ 428/411.1; 252/62.54; 360/134; 360/135; 360/136; 427/44; 428/423.1; 428/423.7; 428/522; 428/694; 428/900
[58] Field of Search ................. 427/44, 128; 428/694, 428/900, 423.1, 423.7, 522, 411.1, 695; 360/134–136; 252/62.54

[56] References Cited

U.S. PATENT DOCUMENTS

| | | | |
|---|---|---|---|
| 3,169,945 | 2/1965 | Hostettler | 524/223 |
| 3,700,643 | 10/1972 | Smith | 526/282 |
| 4,320,171 | 3/1982 | Motz | 428/694 |
| 4,328,282 | 5/1982 | Lehner | 428/480 |
| 4,407,853 | 10/1983 | Okita | 428/694 |
| 4,415,630 | 11/1983 | Kubota | 428/694 |
| 4,448,848 | 5/1984 | Okita | 428/694 |

Primary Examiner—Ellis P. Robinson
Attorney, Agent, or Firm—Steven T. Trinker

[57] ABSTRACT

Described herein is a magnetic recording medium comprising a substrate and a magnetic recording layer thereon comprising a cured binder and magnetic particles, the binder containing a blend of a thermoplastic polymer or polymers and a polyfunctional acrylate derivatives of a caprolactone-polyol or a polyester polyol.

11 Claims, No Drawings

MAGNETIC RECORDING MEDIUM

BACKGROUND OF THE INVENTION

Described herein is a magnetic recording medium comprising a substrate and a magnetic recording layer thereon comprising a radiation cured binder and magnetic particles, the binder containing a blend of a thermoplastic polymer or polymers and a polyfunctional acrylate derivative of a caprolactone-polyol or a polyester polyol.

Magnetic recording media are in the form of magnetic cards and disks, reels, video tapes, computer tapes, etc. Magnetic tape, for example, consists of a very uniform magnetic coating which is bonded to a plastic support film. Magnetic tape is utilized for audio, video, computer, instrumentation, or other recordings.

The basic components of a magnetic tape are the plastic support film and the magnetic coating. The magnetic coating contains magnetized particles which store the information and a resinous binder which provides the cohesive matrix between the magnetic particles and adheres them to the support film. The preferred polymer for the support film is polyethylene terephthalate due to its excellent dimensional stability, high tensile strength, toughness, pliability and resistance to attack by mildew and fungus. However, other polymers such as polyvinyl chloride and polypropylene have been used. Gamma ferric oxide is the most widely used magnetic particle.

Binder systems for magnetic tape coatings are based on blends of hard and plasticizing or toughening resins. The combination of a rigid polymer and an elastomeric polymer offer performance advantages which cannot be obtained with a single component or other simple resin system.

Most conventional binders contain a blend of a hydroxylated copolymer resin, and an elastomeric modifier. The copolymer is usually modified with from 30% to 60% by weight of a plasticizing or toughening resin to increase its abrasion resistance. The amount of modifier used in a formulation is a function of the performance requirements of the particular application. The modifying resin may be a nitrile rubber, a polyester, an alkyd or a polyester urethane. The latter resin is preferred for high performance applications. The polyester urethanes are the reaction products of polyester polyols, short chain diols, and isocyanates. These resins have excellent toughness and abrasion resistance.

Both the hydroxylated copolymer resins and polyester urethane resin contain hydroxyl functionality. The blends of these resins are crosslinked with polyfunctional isocyanates to further increase their toughness and abrasion resistance. Crosslinking of the resins occurs over a period of time including while the tapes are in storage. If the crosslinking takes place prior to calendering, the tape does not polish properly.

For the highest performance applications, such as computer tapes, phenoxy resins are preferred as the hydroxyl containing polymer because of their superior durability, toughness, and thermal stability. The phenoxy resin can be modified with the same polyester urethane plasticizing resins and isocyanate prepolymer crosslinkers or polyfunctional isocyanates as the copolymer resin.

However, curing of polyurethane-based coatings is accomplished with the addition of various multifunctional isocyanates. Once the isocyanate is mixed with the coating formulation, the crosslinking reaction begins immediately, giving the coating a limited pot life on the coater or during the coating/calendering processes. Another disadvantage is the extreme reactivity of the isocyanate molecule with water. A trace of water in the solvent, or moisture absorbed on the magnetic particle, or even moisture in the plant environment will quickly react with the isocyanate negating its ability to crosslink the polyurethane. The resulting film will fall far short of designed toughness and flexibility.

Controlling the many sources of moisture is difficult so nonuniform batch-to-batch cures, are unavoidable. In an effort to overcome this problem, the coated and calendered tape is often stored for two or more weeks; sometimes at elevated temperatures under dry conditions to assure a complete cure. Despite this, it is not uncommon to reject substantial quantities of uncured tape after postcure.

Attempts have been made to formulate binder systems which could be cured by electron beam radiation. Electron curing has been shown to provide a thorough, consistent cure, not possible with the polyurethane/hydroxylated polymer/isocyanate systems.

Experimenters have found they could formulate electron beam cured coatings with resin systems consisting of simple blends of commercially available polyurethanes plus electron curable multifunctional acrylates and methacrylates derived from simple diols, triols and tetraols not containing repeating polyester units. These multifunctional acrylate and methacrylates include trimethylolpropane triacrylate, tripropylene glycol diacrylate, pentaerythritol triacrylate, pentaerythritol tetraacrylate, ethylene glycol dimethacrylate, triethylene glycol dimethacrylate, trimethylolpropane dimethacrylate, and the like. These blends showed good binding of the magnetic particles, adequate adhesion to polyester film and elimination of blocking (lifting of the coating on reeled tape). However, the mechanical properties of the tapes were poor due to the use of multifunctional acrylates such as trimethylolpropane triacrylate and pentaeythritol triacrylate which embrittled the film. Also, the surface wear resistance of the resulting tapes was variable. Further, these acrylates were volatilized during the solvent drying step when solvents such as cyclohexanone, tetrahydrofuran, etc. were removed. The result was that systems employing these acrylates did not meet the standards of the magnetic media industry.

Thus, there is a need to develop binder systems which are suitable for electron beam curing and which can improve the wear characteristics of the magnetic coating.

THE INVENTION

This invention is directed to a magnetic recording medium comprising a substrate and a magnetic recording layer thereon comprising a cured binder and magnetic particles, the binder containing a blend of a thermoplastic polymer or polymers and a polyfunctional acrylate derivative of a caprolactone-polyol or a polyester polyol. Additionally, the blend may contain a suitable surfactant, photoinitiator and/or other ingredients commonly used in the magnetic tape art.

The acrylate containing binders of this invention can be cured by electron beam radiation, afford flexibility, and exhibit good compatibility with the thermoplastic resins used in magnetic tape binders. Further, the binders of this invention allow retention of flexibility or improve flexibility and have improved adhesion and solvent resistance.

The polyfunctional acrylate derivatives of caprolactone-polyols which are used herein are characterized by the following formula:

$$(CH_2=CCOO)_m-R_2-(OH)_n \quad \text{(II)}$$
$$\hspace{1.3cm}|$$
$$\hspace{1.3cm}R_1$$

wherein $R_1$ is hydrogen or methyl, $R_2$ is the residue a caprolactone polyol prepared by reaction of caprolactone with an organic functional initiator, which can be any polyhydroxy compound as shown in U.S. Pat. No. 3,169,945, m is an integer of 2 to 8 or more, and n is an integer of 0 to 6, with the proviso that the sum of m+n is 8 or less, preferably m is an integer of 2 to 6 and n is an integer of 0 to 4, and preferably the sum of m+n is 6 or less.

The caprolactone polyols that can be used to prepare the polyfunctional acrylate derivatives of this invention include many of the known caprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having as least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3-methyl-1-5-pentanediol, cyclohexanediol, 4,4'-methylenebiscyclohexanol, 4,4'-isopropylidene biscyclohexanol, xylenediol, 2-(4-hydroxymethylphenyl)ethanol, 1,4-butanediol, 1,6-hexanediol and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

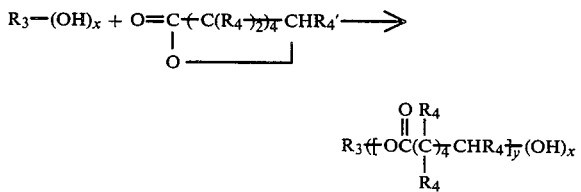

In this equation the organic functional initiator is the $R_3-(OH)_x$ compound and the caprolactone is the following compound:

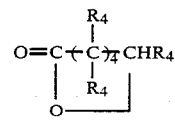

this can be caprolactone itself or a substituted caprolactone wherein $R_4$ is halogen, an alkyl, alkoxy, aryl, cycloalkyl, alkaryl or aralkyl group having up to twelve carbon atoms and wherein at least six of the $R_4$ groups are hydrogen atoms, as shown in U.S. Pat. No. 3,169,945. The polycaprolactone polyols that are used are shown by the formula on the right hand side of the equation; they can have an average molecular weight of from 200 to about 10,000. The preferred polycaprolactone polyol compounds are those having an average molecular weight of from about 176 to about 8,000, most preferably from about 176 to 3,500. The most preferred are the polycaprolactone diol compounds having an average molecular weight of from about 290 to about 2,500 and the polycaprolactone triol and tetrol compounds having an average molecular weight of from about 248 to about 3,500; these are most preferred because of their low viscosity properties and amorphous characteristics. In the formula y is an integer representing the average number of repeating units needed to produce the compound having said molecular weights. The hydroxyl number of the polycaprolactone polyol can be from about 8 to 640, preferably from 200 to 500; and the polycaprolactone polyol can have an average of from about 2 to 8, preferably, 3 to 6, hydroxyl groups.

Illustrative of polycaprolactone polyols that can be used in this invention, one can mention the reaction products of a polyhydroxyl compound having an average from 3 to 8 or more hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

| POLYCAPROLACTONE POLYOLS | | |
|---|---|---|
| Initiator | Average MW of polyol | Average No. of CPL units in molecules |
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500) | 2,868 | 12 |

POLYCAPROLACTONE POLYOLS -continued

| Initiator | Average MW of polyol | Average No. of CPL units in molecules |
|---|---|---|
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolethane | 576 | 4 |
| 30 Trimethylolpropane | 590 | 4 |
| 31 Trimethylolpropane | 750 | 5.4 |
| 32 Trimethylolpropane | 1,103 | 8.5 |
| 33 Tiethanolamine | 890 | 6.5 |
| 34 Erythritol | 920 | 7 |
| 35 Pentaerythritol | 1,219 | 9.5 |
| 36 Dipentaerythritol | 938 | 6 |
| 37 Fructose | 865 | 6 |

The structures of the compounds in the above tabulation are obvious to one skilled in the art based on the information given.

The structure of compound No. 7 is:

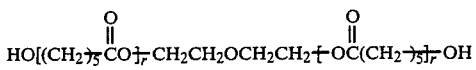

wherein the variable r is an integer, the sum of r+r has an average value of 3.7 and the average molecular weight is 527. The structure of compound No. 20 is:

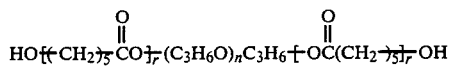

wherein the sum of r+r has an average value of 6 and the average molecular weight is 1,684. This explanation makes explicit the structural formulas of compounds 1 to 34 set forth above.

Multifunctional polycaprolactone polyols, such as hexols, etc. suitable for use in the present invention can be prepared by the catalyzed addition of an excess of polycaprolactone polyols to an epoxy resin. Illustrative polycaprolactone polyols useful in the preparation of multifunctional caprolactone polyols include polycaprolactone diols, polycaprolactone triols, polycaprolactone tetraols and the like including mixtures thereof. Many of these polycaprolactone polyols are commercially available from Union Carbide Corporation. Cycloaliphatic epoxides suitable for use in preparing the polycaprolactone hexols include 3,4-epoxycyclohexylmethyl-3,4-epoxycyclohexane carboxylate, bis(3,4-epoxycyclohexylmethyl)adipate, vinyl cyclohexane dioxide and the like. Many of these cycloaliphatic epoxides are commercially available from Union Carbide Corporation. A suitable polymerization catalyst is diethylammonium triflate which is commercially available from the 3M Company as FC-520. In the case of glycidyl epoxides, tertiary amines are also useful catalysts.

A preferred method for preparation of the polycaprolactone hexols comprises adding one or more polycaprolactone triols to a reactor, heating the polycaprolactone triols to a temperature of about 100° C. and adding the catalyst using a nitrogen sparge as soon as the polycaprolactone triols are molten. The polycaprolactone triols and catalyst mixture is then heated to a temperature of from about 150° C. to about 200° C. and a cycloaliphatic epoxide is added to the mixture. The reaction is carried out for about one hour to about three hours or until the oxirane content has been reduced to a nil or almost a nil value. A modification of this process can involve initially adding all of the ingredients into the reactor. A further modification of this method can involve a vacuum treatment of from 10 to 30 minutes after the catalyst addition and/or the use of a vacuum during the heating of the polycaprolatone triols to a molten state.

The polyfunctional acrylate derivative is prepared by reacting the caprolactone polyol with acrylic or methacrylic acid in the presence of a strong acid catalyst. The strong acid catalyst may be sulfuric, methane sulfonic, or p-toluene sulfonic acid, or ion exchange resins, and the like. The catalyst is used in amounts of from about 0.1 to about 5.0, preferably from about 0.5 to about 2.0 percent.

The reaction to prepare the polyfunctional acrylate derivative is carried out at a temperature of from about 60° to about 120° C., or higher, preferably from about 80° to about 105° C. The reaction may be carried out at atmospheric pressure, although higher or lower pressures may be used. The reaction is generally carried out in the presence of oxygen to prevent polymerization. Oxygen is generally sparged through the reaction mixture during the course of the reaction. The reaction is carried out for a period of time until the theoretical amount of water is removed or until no further water is produced. This period is generally from about 3 to about 8 hours.

The reaction is generally carried out in the presence of a solvent of the type which removes water formed during the reaction as an azeotrope. Among the suitable solvents which can be used are the hydrocarbons such as octane, heptane, hexane, cyclohexane, benzene, toluene or the xylenes, etc.

The reaction is generally carried out in the presence of a suitable inhibitor or combination of inhibitors to prevent polymerization of the acrylic or methacrylic acid double bonds. These inhibitors include the monomethyl ether of hydroquinone, benzoquinone, phenothiazine, methylhydroquinone, methylene blue, 2,5-di-t-butylhydroquinone, hydroquinone, and other common free radical inhibitors known in the art. The level of inhibitor used is from about 100 parts per million to about 5.0 percent.

In the reaction, from about one equivalent to about three equivalents of the caprolactone or polyester polyol is reacted with from about 1.2 to about 0.8 molar equivalent of acrylic acid or methacrylic acid to form the caprolactone or polyester polyacrylate. A hydroxyl containing acrylated polyol can be prepared by reacting an excess equivalent of polyol with acrylic acid.

The process is carried out by adding the caprolactone polyol and solvent and then adding the acrylic or methacrylic acid and catalyst to a reaction vessel and then heating this to the reflux temperature. During the reaction, oxygen (air) is continually bubbled through the reaction. After the reaction is complete, the excess acid may be neutralized by adding a strong base such as sodium or potassium hydroxide to the reaction, or the acid may be stripped off by conventional techniques or removed by an ion exchange resin. Excess water may be removed from the reaction by, for example, adding a conventional drying agent such as magnesium sulfate, or by the use of vacuum distillation. Air must be bubbled into the reaction mixture during stripping.

The acrylic esters may be additionally produced by other methods such as transesterification or acid chloride reaction.

The polyfunctional acrylate monomer produced has a viscosity of from about 50 to about 2000 centipoise at 25° C.

Mixtures of the polyfunctional acrylate derivatives may be used herein.

The polyester polyols are the reaction products of polyfunctional organic carboxylic acids and polyhydric alcohols. The acids which may be used included adipic, maleic, itaconic phthalic, isophthalic, terephthalic glutaric, pimelic, azelaic, and sebacic acids, mixtures of these, and the like. The polyhydric alcohols include ethylene glycol, diethylene glycol, neopentyl glycol, ED-204, 1,3- and 1,4-butanediol, 1,2- and 1,3-propane diol, 1,6 hexanediol, trimethylolpropane, glycerine, pentaerythritol, dipentaerythritol, oligomers of ethylene glycol, oligomers of propylene glycol, mixtures of these, and the like.

The polyester polyols are prepared by conventional methods and many are commercially available.

The polyfunctional acrylate monomer may be prepared by reacting the polyester polyol with acrylic or methacrylic acid by the method as fully described above.

The binder of this invention includes one or more thermoplastic resins free or essentially free from any radiation-curable, unsaturated bond with or without addition of a thermoplastic modifier. Among useful thermoplastic resins for this purpose are vinyl chloride-vinyl acetate copolymers, partially hydrolyzed vinyl chloride-vinyl acetate copolymers, vinyl chloride-vinyl acetate-maleic acid or maleic anhydride copolymers, vinyl chloride-vinyl acetate-glycidyl acrylate or methacrylate copolymers, vinyl alcohol and other vinyl chloride resins, cellulose nitrates, cellulose acetate, cellulose acetate-butyrate, and other cellulose derivatives, polyvinyl alcohol resins, epoxy resins, thermoplastic polyurethane resins, polyamide resins, polycaprolactone, hexanediol adipates, and polyester resins, polyacrylate polyvinylidine chloride, acrylic resins and phenoxy resins. The thermoplastic elastomers may be one or more of a polyurethane elastomer and their prepolymers, acrylonitrile-butadiene copolymers, polybutadiene elastomers, styrene-butadiene copolymers, chlororubber, acrylic rubbers, polyisoprene rubbers, epoxy-modified rubbers and plasticized polyesters. The addition of such thermoplastic resins is effective in balancing hardness, toughness, flexibility and other properties of the product.

The resins are dissolved in a suitable conventional, inert solvent. Conventional solvents include cyclohexanone, toluene, methyl isobutyl ketone, tetrahydrofuran, methyl amyl ketone, ethoxy ethyl acetate, and the like and mixtures of these solvents such as, for example, a 2:2:1 mixture of methyl isobutyl ketone, toluene and cyclohexanone.

When conventional solvents are used, they are employed at a concentration of from 1 to about 99%, the concentration being dependent on the viscosity needed for proper application or other characteristics. Generally, the conventional or inert solvents will be removed or partially removed by evaporation with or without the use of thermal energy before the radiation cure or other processes such as calendering is effected.

The magnetic particles which may be used in the present invention are acicular or granular $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co-base-compound-adsorbed $\gamma$-$Fe_2O_3$, a Co-base-compound-adsorbed $Fe_3O_4$ (including those oxidized to an intermediate state between itself and $\gamma$-$Fe_2O_3$), and acicular $CrO_2$. (The term "Co-base compound" as used herein means cobalt oxide, cobalt hydroxide, cobalt ferrite, cobalt ion-adsorbates and the like which enable the magnetic particles to take advantage of the magnetic anisotropy of cobalt in improving its coercive force.) Also, the magnetic particle may be a ferromagnetic metal element or alloy, such as Co, Fe-Co, Fe-Co-Ni, or the like. Such a fine magnetic particle is prepared in a number of ways, including wet reduction of the starting material with a reducing agent such as $NaBH_4$, a treatment of the iron oxide surface with a Si compound and subsequent dry reduction with $H_2$ gas or the like, and vacuum evaporation in a low-pressure argon gas stream. Fine particles of monocrystalline barium ferrite may be employed as well. The fine magnetic powder is used in the form of acicular or granular particles, depending on the application of the resulting magnetic recording medium.

The binder of this invention can be cured by ionizing or non-ionizing radiation means including, but not limited to, ultraviolet light and electron beam radiation. When the binder is mixed with the magnetic particles this system is cured by ionizing radiation, specifically electron beam radiation. These curing methods and the equipment that can be used for them are well known to those skilled in the art. When the binder is to be cured by non-ionizing radiation, for example, when the binder composition is used as a subing coat, the presence of a photoinitiator therein is desirable. Any of the known photoinitiators can be used. Illustrative of suitable photoinitiators one can mention 2,2-diethoxyacetophenone, 2- or 3- or 4-bromoacetophenone, 3- or 4-allylacetophenone, 2-acetonaphthone, benzaldehyde, benzoin, the alkyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, thioxanthone, methylthioxanthone, $\alpha,\alpha,\alpha$,-trichloro para t-butyl acetophenone, 4-methoxybenzophenone, 3-chloro-8-nonylxanthone, 3-iodo-7-methoxyxanthone, benzaldehyde, carbazole, 4-chloro-4'-benzyl-benzophenone, fluorene, fluorenone, 1,4-naphthylphenylketone, 2,3-pentanedione, 2,2-di-sec-butoxy acetophenone, dimethoxyphenyl acetophenone, propiophenone, chlorothioxanthone, isopropylthioxanthone, dodecylthioxanthone and the like, or any mixtures of these. The foregoing list is meant to be illustrative only and is not meant to exclude any suitable photoinitiators known to those skilled in the art. If desired a polyfunctional isocyanate such as toluene diisocyanate, isophorone diisocyanate, 4,4'-diphenylethane diisocyanate, 4,4'-dicyclohexylmethane diisocyanate, and the like can be included in the formulation when compounds with free hydroxyl groups are present in the system. Also, minor amounts of other acrylates such as hexanediol diacrylate, trimethylolpropane triacrylate, 2-ethylhexol acrylate, and the like can be in the formulation for the purpose of viscosity reduction, coating hardness, and the like. Those skilled in the art will know the concentrations at which photoinitiators are effectively employed and generally the concentration will not exceed 15 weight percent of the radiation curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)propionyloxypropane, and the like, or any combination of these.

The binders of this invention can also be cured upon exposure to any source of radiation emitting actinic radiation at a wavelength within the ultraviolet and visible spectral regions. Suitable sources of radiation include mercury, xenon, carbon arc lamps, sunlight, etc. Exposures may be from less than about 1 second to 10 minutes or more depending upon the amounts of particular polymerizable materials and photoinitiator being utilized and depending upon the radiation source and distance from the source and the thickness of the coating to be cured. The compositions may also be photopolymerized by exposure to electron beam radiation. Generally speaking the dosage necessary is from less than 1 megarad to 100 megarads or more, typically from about 3 to 20 megarads.

The substrate to be coated with the magnetic coating material in accordance with the present invention may be a polyethylene terephthalate or polypropylene film that is in wide use as a base material for magnetic recording media. Where heat resistance is an important consideration, a polyimide film, polyamide film, polyarylether film, or the like may be utilized. In the case of a polyester film as a thin base, it is often used after monoaxial or biaxial orienting. It is well known that pretreatment of the film may be beneficial to promote wetting and adhesion.

For the magnetic coating material of the invention, it is advisable to use various additives usually employed for these applications, such as an antistatic agent, lubricant, dispersant, sensitizer, leveling agent, wear-resisting agent, and film-reinforcing agent, to suit the particular end use.

The recording medium may generally be prepared by dissolving the binder in sufficient volatile vehicle to provide a coatable dispersion of fine magnetizable particles. The dispersion can then be coated onto the substrate to provide a coating thereon. The magnetic recording medium may be prepared by methods described in the art such as in, for example, S. Tachihara, "Magnetic Coatings and their Applications in Japan", Progress in Organic Coatings, 10 (1982), pages 195 to 204.

The magnetic recording medium may be a magnetic recording tape, magnetic cards, program cards, disks, reels, and the like.

EXAMPLES

The following Examples serve to give specific illustration of the practice of this invention but they are not intended in any way to act to limit the scope of this invention.

The following designations used in the Examples have the following meaning:

Caprolactone acrylate (I)—a caprolactone acrylate prepared as described below.

Caprolactone acrylate (II)—a caprolactone acrylate prepared as described below.

Caprolactone acrylate (III)—a caprolactone acrylate prepared as described below.

Polyurethane—a polyurethane (Estane 5701-F1 obtained from BF Goodrich) having a Brookfield viscosity of about 300 to 700 centipoise when measured at 15% total solids in tetrahydrofuran by the BFG-1066B test method.

VAGH—a copolymer of 91 percent vinyl chloride and hydroxy content of 6 percent when calculated as vinyl alcohol and 3 percent vinyl acetate having an inherent viscosity of 0.50 (0.2 gm of resin in/100 ml of cyclohexanone at 30° C.)

Surfactant (I)—A silicone surfactant with the structure:

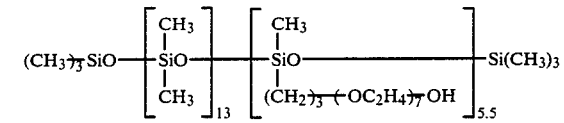

Surfactant II—an alkylphenoxy-poly(ethyleneoxy)ethyl mono-and diester of phosphoric acid (GAFAC RE-610 obtained from General Aniline and Film).

Photoinitiator I: 2,2-dimethoxy-2-phenylacetophenone (Irgacure 651 obtained from Ciba-Geigy).

Poly(hydroxyether): a reaction product of bisphenol-A and epichlorohydrin (having a reduced viscosity of 0.43 dl/g measured as 0.2 g/100 ml in tetrahydrofuran at 25° C., PKHH obtained from Union Carbide Corporation).

Preparation of Caprolactone acrylate (I)

A 2000 ml glass reaction flask was equipped with a stirrer, thermometer and condenser, Dean-Stock trap air inlet and heating mantle and used as the reaction vessel. 300 grams of a trihydroxyfunctional polycaprolactone polyol with an average hydroxyl number of 310 and an average molecular weight of 540 (TONE-0305 obtained from Union Carbide Corporation), 88.4 g. of glacial acrylic acid, 150 ml. of benzene, 5 ml. of concentrated sulfuric acid and 5 g. of hydroquinone were added to the reaction flask at room temperature. The contents of the flask were then heated to about 85° C. over a period of one hour and maintained at reflux at atmospheric pressure until no further water was produced (about 4.5 hours). During the reaction, air was continually bubbled through the reaction. The reaction mixture was cooled to about 60° C. in a separatory funnel and about 50 ml of benzene added. Then, about 200 g of a 15 percent aqueous sodium hydroxide solution was dripped through the separatory funnel. A second aliquot of 200 g of a 15 percent aqueous sodium hydroxide solution was added and then the contents shaken. Excess acid and hydroquinone inhibitor were washed out by shaking the solution three times with 50 g of a 15 percent aqueous sodium hydroxide solution. After the contents settled, 10 g of magnesium sulfate was added while stirring to remove any remaining water, then the contents filtered to remove the magnesium sulfate. 100 parts per million of methylethyl hydroquinone based on the final product was added and the contents were then stripped of solvent. A 60 to 70% yield was obtained. The product had a viscosity of 250 centipoise.

Preparation of Caprolactone acrylate (II)

The procedure for the Preparation of Caprolactone Acrylate (I) was repeated except that the reaction flask was charged with the following:
300 grams of a trihydroxyfunctional polycaprolactone polyol with an average hydroxyl number of 560 and an average molecular weight of 300 (TONE-0301) obtained from Union Carbide Corporation)
147.3 g Glacial acrylic acid
600 ml Benzene
5 ml Concentrated sulfuric acid
4 g Hydroquinone Preparation of Caprolactone acrylate (III)

The procedure for the Preparation of Caprolactone Acrylate (I) was repeated except that the reaction flask was charged with the following:
311 g of a tetrahydroxyfunctional polycaprolactone polyol produced by reacting pentaerythritol and caprolactone with an average hydroxyl number of 360 and an average molecular weight of 622
174 g Glacial acrylic acid
600 ml Benzene
1 g Hydroquinone
2 ml Concentrated sulfuric acid
The product had a viscosity of 624 centipoise.

EXAMPLES 1 TO 5 AND CONTROL A

The ingredients shown in Table I were placed in a container and allowed to dissolve. When solution was effected, 100 gms. of each solution was placed in an amber glass bottle; and 0.2 gm. of Photoinitiator (I) was added to each bottle. The ingredients were agitated to effect solution of the photoinitator. Then 0.5% by weight of Surfactant (I) was added to each solution and the mixture was well agitated.

TABLE 1

| Ingredients | Control A | Example (parts by weight) | | | | |
|---|---|---|---|---|---|---|
| | | 1 | 2 | 3 | 4 | 5 |
| Polyurethane | 12 | 12 | 12 | 12 | 12 | 12 |
| VAGH | 18 | 18 | 18 | 18 | 18 | 18 |
| Caprolactone acrylate (I) | 0 | 1.6 | 3.3 | 5.3 | 7.5 | 12.9 |
| Cyclohexanone | 150 | 126 | 133 | 141 | 150 | 172 |
| Wt. % of Caprolactone acrylate in solids | 0 | 5.1 | 9.9 | 15.0 | 20.0 | 30.1 |

Films of each solution were then cast onto release paper with a No. 0.050 smooth draw down bar. The wet films were placed in a forced-air oven at 75° C. for 30 minutes. The temperature was then increased to 100° C., and the samples were maintained at 100° C. for 10 minutes. The purpose of this thermal treatment was to remove the cyclohexanone solvent. The films were then removed from the oven, cooled to room temperature, and cured with a 300 watt/inch, ultraviolet-light, radiation source at a rate of 10 feet per minute. Three passes were used. The cured samples were then cut into dumb bell-shaped tensile specimens with a 0.5-inch gauge length and tested in an Instron tensile tester at a rate of 2 in/in/minute (200%/minute). The results are shown in Table II.

TABLE II

| Properties | Control A | EXAMPLES | | | | |
|---|---|---|---|---|---|---|
| | | 1 | 2 | 3 | 4 | 5 |
| Film Thickness, (in.) | 0.0015 | 0.0036 | 0.0023 | 0.0025 | 0.0036 | 0.0019 |
| Tensile Strength, (psi) | 5674 | 3035 | 6158 | 5118 | 4268 | 6472 |
| Elongation, (%) | 343 | 559 | 376 | 285 | 249 | 345 |

EXAMPLES 6 TO 11 AND CONTROL B

To the indicated amounts of the solutions described in Control A and Example 2 (i.e., mixtures of Urethane, VAGH, Photoinitiator (I), and Surfactant (I), and, in the case of Example 2 Solution, Caprolactone acrylate (I), the ingredients listed in Table III were added.

TABLE III

| Ingredients | EXAMPLES (Parts by weight) | | | | | | |
|---|---|---|---|---|---|---|---|
| | Control B | 6 | 7 | 8 | 9 | 10 | 11 |
| Control A Solution (g) | 15.0 | 15.0 | 15.0 | 15.0 | — | — | — |
| Example 2 Solution (g) | — | — | — | — | — | 20.0 | 20.0 |
| Caprolactone Acrylate (III) (g) | — | 0.251 | 0.501 | 0.752 | 10.0 | 0.40 | 0.80 |
| Photoinitiator (I), (g) | — | — | — | — | 0.10 | — | — |
| Surfactant (I) (g) | 0.08 | 0.08 | 0.08 | 0.08 | 0.05 | 0.10 | 0.10 |
| % Caprolactone Acrylate | 0 | 10 | 20 | 30 | 100 | 10 | 20 |

These ingredients were mixed and allowed to stand at room temperature to disipate air bubbles. Films were then cast onto Warren release paper with a No. 25 smooth draw down bar. The films were then placed in a 75° C. air oven for 30 minutes and at 100° C. for one hour to remove solvent. The films were then exposed to a 300 watt/inch UV light source at 10 feet/minute. After the UV exposure, the films were tack free. In the case of Example 9, a 1/16-inch thick plaque was prepared in a Teflon mold by pouring the mixed ingredients into the mold and curing as described above.

Dog-bone tensile specimens were cut from all cured films except for the plaque of Example 9. This product was very brittle, and it was not possible to prepare tensile test specimens. The crosslinked polymers were tested at a rate of 2 in/in/min. with an Instron tensile tester. The results given in Table IV are an average of three values.

TABLE IV

| Example | Tensile Strength psi | Elongation (%) |
|---|---|---|
| Control B | 5,930 | 258 |
| 6 | 6,283 | 251 |
| 7 | 7,351 | 185 |
| 8 | 7,432 | 147 |
| 9 | — | — |

TABLE IV-continued

| Example | Tensile Strength psi | Elongation (%) |
|---|---|---|
| 10 | 6,872 | 216 |
| 11 | 8,451 | 161 |
| Control A* | 3,650 | 402 |
| 2 | 4,711 | 296 |

*The results obtained for Control A and Example 2 are given for comparison purposes. These are controls for all above examples except Control B and Example 9. Note that Control A and Control B are repeats and that a relatively large difference was obtained. However, even though the repeat data differ, the same trend in properties occurs when the polyfunctional acrylates are added.

It is apparent from the data in Table IV that cured films that contain the caprolactone acrylates (Ex. 6 to 8) and mixtures of acrylates (Ex. 10 and 11) have improved tensile strength and decreased elongation. Even though the elongation is decreased, it remains at a high value, and cured films are considered to be tough materials with good wear properties and durability.

Preparation of Pigment Paste

The following ingredients were blended together. All the liquids were added to a container and the ferric oxide powder was stirred in to form a smooth paste. The paste was then run through an Eiger mill until a pigment dispersion was achieved.

| Formulation | A | B |
|---|---|---|
| Gamma ferric oxide powder[1] | 100 | 100 |
| VAGH 15% by wt. in Cyclohexanone (Solids) | 40 (6.0) | — |
| Polyurethane | | |
| 15% by wt. in Cyclohexanone | 26.7 | — |
| 10% by wt. in Cyclohexanone (Solids) | — | 70 (7.0) |
| Poly(hydroxyether) 10% by wt. in Cyclohexanone (solids) | — | 30 (3.0) |
| Cyclohexanone | 98 | 119 |
| Surfactant (II) | 2.3 | 2.3 |
| Total | 267 | 321 |
| % Resin | 4% | 3% |

[1]Pferrox 2228HC obtained from Pfizer Co.

EXAMPLES 12 TO 20, CONTROL C

The ingredients shown in Table V were blended together by the procedure as described above.

TABLE V

| | EXAMPLES | | | | | | | | | |
|---|---|---|---|---|---|---|---|---|---|---|
| Ingredients | Control C | 12 | 13 | 14 | 15 | 16 | 17 | 18 | 19 | 20 |
| Formulation A | 50 | 50 | 50 | 50 | 50 | 50 | 50 | 50 | 50 | 50 |
| Caprolactone Acrylate (I) | — | 0.4 | 0.8 | 1.6 | — | — | — | — | — | — |
| Caprolactone Acrylate (II) | — | — | — | — | 0.4 | 0.8 | 1.6 | — | — | — |
| Caprolactone Acrylate (III) | — | — | — | — | — | — | — | 0.4 | 0.8 | 1.6 |

EXAMPLES 21 TO 29; Control D

The ingredients shown in Table VI were blended together by the procedure described above.

TABLE VI

| | EXAMPLES | | | | | | | | | |
|---|---|---|---|---|---|---|---|---|---|---|
| Ingredients | Control D | 21 | 22 | 23 | 24 | 25 | 26 | 27 | 28 | 29 |
| Formulation B | 50 | 50 | 50 | 50 | 50 | 50 | 50 | 50 | 50 | 50 |
| Caprolactone Acrylate (I) | — | 0.3 | 0.6 | 1.2 | — | — | — | — | — | — |
| Caprolactone Acrylate (II) | — | — | — | — | 0.3 | 0.6 | 1.2 | — | — | — |
| Caprolactone Acrylate (III) | — | — | — | — | — | — | — | 0.3 | 0.6 | 1.2 |

The pigment dispersions were coated onto a polyethylene terephthalate film with a wire wound rod to a thickness of about 0.2 mils and air dryed to remove solvent. The sample was then exposed to an electron beam using an Electrocurtain system (Model CB 150/15/0.80L, from Energy Sciences, Inc.)

The following test conditions were used for all samples:

| Test | Line Speed (ft./min.) | Dose (Mrads) | Oxygen (ppm) |
|---|---|---|---|
| 1 | 50 | 6 | 700 |
| 2 | 50 | 8 | 700 |
| 3 | 50 | 10 | 700 |
| 4 | 50 | 10 | >25,000 |

The samples were then subjected to an abrasion test in which an eraser was rubbed back and forth over the coating until the coating was removed. The CONTROLS used in these experiments were coated samples which were not cured by the electron beam. The results are shown in Table VII.

TABLE VII

| | Examples (No. of erasure rubs)* | | | | | | | | | | | | | | | | | |
|---|---|---|---|---|---|---|---|---|---|---|---|---|---|---|---|---|---|---|
| Test Procedure | 12 | 13 | 14 | 15 | 16 | 17 | 18 | 19 | 20 | 21 | 22 | 23 | 24 | 25 | 26 | 27 | 28 | 29 |
| CONTROLS | 45 | 20 | 15 | 20 | 10 | 20 | 66 | 59 | 13 | 20 | 30 | 20 | 100 | 26 | 25 | 25 | 10 | 35 |
| Test 1 | 35 | 65 | 40 | 26 | 35 | 75 | 50 | 130 | 96 | 30 | 85 | 63 | 35 | 30 | 25 | 25 | 45 | 23 |
| Test 2 | 44 | 55 | 65 | 53 | 23 | 80 | 25 | 60 | 257 | 50 | 30 | 40 | 15 | 30 | 35 | 20 | 30 | 18 |
| Test 3 | 35 | 60 | 35 | 26 | 90 | 105 | 17 | 60 | 214 | 33 | 70 | 80 | 33 | 25 | 20 | 17 | 30 | 17 |
| Test 4 | 45 | 55 | 45 | 83 | 125 | 30 | 50 | 110 | 99 | 20 | 26 | 13 | 25 | 33 | 20 | 25 | 20 | 30 |

*The number of one-way erasure rubs to completely remove the coating from the substrate. The number of rubs was normalized to 1.0 mil to compare films in which the thickness may vary.

What is claimed is:

1. A magnetic recording medium comprising a substrate and a magnetic recording layer thereon comprising a cured binder and magnetic particles, the binder containing a blend of a thermoplastic polymer or polymers and a polyfunctional acrylate derivative of a caprolactone-polyol characterized by the formula:

$$(CH_2=CCOO)_m-R_2-(OH)_n \qquad (II)$$
$$\phantom{(CH_2=CCOO)_m}|$$
$$\phantom{(CH_2=CCOO)_m}R_1$$

wherein $R_1$ is hydrogen or methyl, $R_2$ is the residue of a caprolactone-polyol having an average molecular weight of from about 200 to about 10,000, m is an integer of 2 to 8 and n is an integer of 0 to 6, with the proviso that the sum of m+n is 8 or less.

2. A magnetic recording medium as defined in claim 1 wherein $R_2$ is the residue of a caprolactone polyol prepared by the reaction of epsilon-caprolactone with trimethylolpropane.

3. A magnetic recording medium as defined in claim 1 wherein $R_2$ is the residue of a caprolactone-polyol prepared by the reaction of epsilon-caprolactone with pentaerythritol.

4. A magnetic recording medium as defined in claim 1 wherein $R_1$ is hydrogen, m is 3 and n is 0.

5. A magnetic recording medium as defined in claim 1 wherein $R_1$ is hydrogen, m is 4 and n is 0.

6. A magnetic recording medium as defined in claim 1 wherein $R_1$ is hydrogen, m is 5 and n is 0.

7. A magnetic recording medium as defined in claim 1 wherein $R_1$ is hydrogen, m is 6 and n is 0.

8. A magnetic recording medium as defined in claim 1 wherein the thermoplastic polymer contains a polyurethane.

9. A magnetic recording medium as defined in claim 1 wherein the thermoplastic polymer contains a poly(hydroxyether).

10. A magnetic recording medium as defined in claim 1 wherein the thermoplastic polymer contains a vinyl chloride copolymer.

11. A magnetic recording medium as defined in claim 1 wherein the thermoplastic polymer is a mixture of a polyurethane, a poly(hydroxyether), and/or a vinyl copolymer.

* * * * *